Dec. 4, 1928.
F. E. CLARK
PISTON RING
Filed Dec. 2, 1926
1,694,311
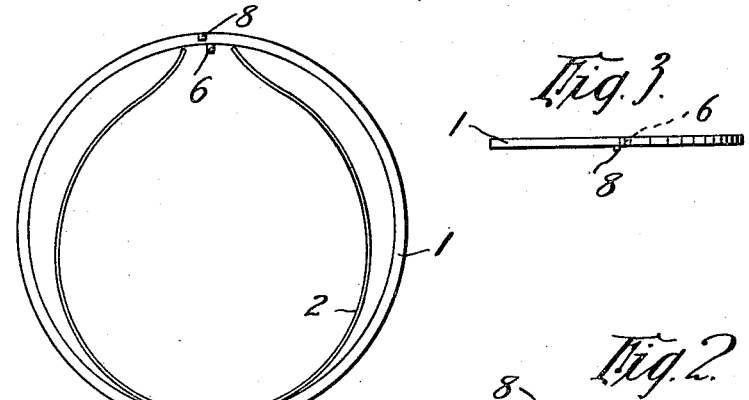
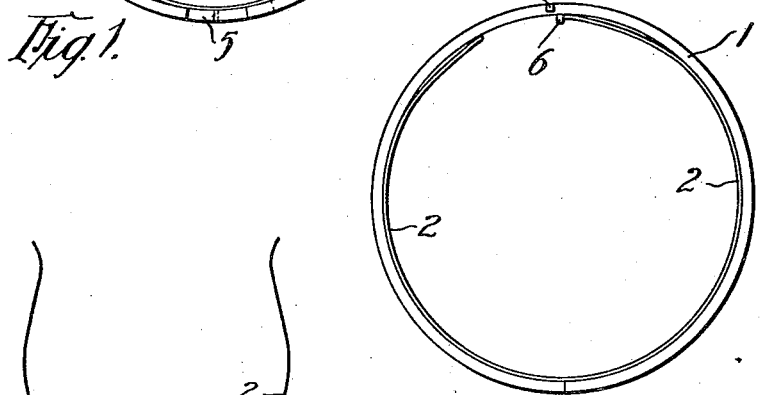
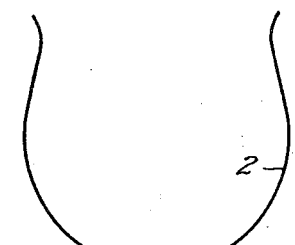
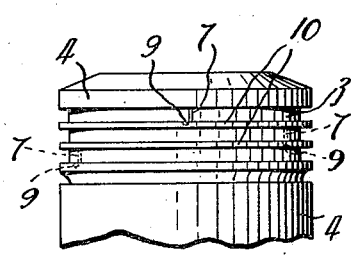
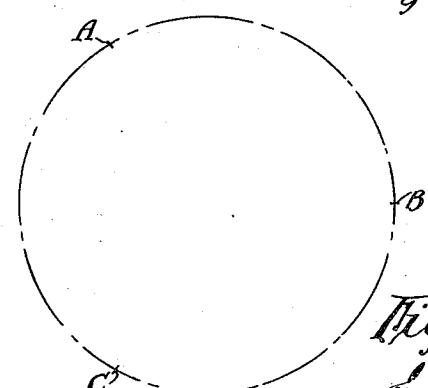
Inventor:
Frederick Albert Clark,
by Wright, Brown, Quinby & May
Attys.

Patented Dec. 4, 1928.

1,694,311

UNITED STATES PATENT OFFICE.

FREDERICK ELBERT CLARK, OF ALBERT PARK, VICTORIA, AUSTRALIA, ASSIGNOR TO FRANCES IDA SCHILLING, OF BRIGHTON BEACH, VICTORIA, AUSTRALIA.

PISTON RING.

Application filed December 2, 1926, Serial No. 152,166, and in Australia January 22, 1926.

This invention has been devised to provide improvements in and relating to pistons of engines, and is particularly useful for the piston of that type of internal combustion engine employed with motor vehicles.

The effectiveness of this invention is particularly noticeable with internal combustion engines that have had a great deal of wear, and the use of the invention obviates the necessity of reboring of cylinders and the installation of new pistons.

A piston constructed and arranged according to this invention will be found to be well fitting, and which during its up and down stroke will have a direct thrust i. e. an even motion within the cylinder bore, so lessening the side pressure on the walls thereof, reducing the wear and tear on the cylinder to a minimum, and furthermore the piston is provided with a support, and with aluminium pistons generally fitted slack in cylinders expansion is allowed, and the piston is prevented from knocking against cylinders when engine is cold.

The compression of the explosive charge is made within certain limits in the cylinder, and by doing so causes the explosion to take place with much greater energy.

In order that my invention may be the more easily understood, reference will be made to the accompanying sheet of drawings in which—

Figure 1 is an edge view of a piston ring comprising inner and outer members, the ring being shown out of engagement with a groove of the piston.

Figure 2 shows the position taken by both the outer and inner members when the piston is in the cylinder.

Figure 3 is an edge view, on a reduced scale, of the outer ring member.

Figure 4 is an edge view, on a reduced scale, showing the form of the inner ring member when separated from the outer member.

Figure 5 indicates diagrammatically the relative positions of the piston holes and holding pins of three rings in the respective grooves of the piston.

Figure 6 illustrates a portion of a piston with grooves for three rings and shows the relative positions of the holes for the holding pins of the outer ring members.

The same reference characters indicate the same parts in all of the figures.

In the drawings, 4 designates a portion of a piston having the usual peripheral grooves, 3, for the reception of piston rings of the improved construction hereinafter described.

In the inner wall of each groove is a radial hole 7, and in one of the side walls is a lateral hole 9, in close proximity to the hole 7. Each piston ring is composed of two members 1 and 2. The member 1 is expansible and annular and has at one side the usual slip joint 5, and at the opposite side an inwardly projecting pin 6, adapted to enter a radial hole 7, to anchor the member 1 to the piston.

The member 2 is a resilient strip normally expanded, so that it has the substantially U-shape shown by Figure 4, its ends being widely spaced apart. The inner member 2 is so inserted in the outer member 1, that its ends are at opposite sides of, and in close proximity to the pin 6, so that rotation of the inner member relative to the outer member, is limited, and practically prevented. The inner member is contracted and tensioned by its insertion in the outer member, and caused to exert a distributed outward pressure thereon, on the outer member from its midlength to its end portions, thereby causing the outer member to bear yieldingly and continuously on the internal wall of a cylinder.

The pins 6 and 8 constitute anchoring members cooperating with complemental anchoring members provided by the holes 7 and 9 in the piston. Breakage of either pin, the other remaining intact, does not, therefore, affect the anchorage of the ring, simultaneous breakage of the two pins being unlikely. The holes 7 and 9 in each piston groove are arranged in staggered relation to the holes of the other grooves, the slip joints 5 of the outer ring members 1, and the gaps between the inner ends of the inner members 2, being correspondingly staggered, as indicated diagrammatically by Figure 5, in which A designates the position of the holes 7 and 9, and the pins 6 and 8 anchoring the top ring, B the positions of the holes and pins anchoring the second ring, and C the positions of holes and pins anchoring the third ring. It is obvious that any desired number of rings may be employed.

The inner member 2 may be of any suitable resilient metal, imparting to it the normal form shown by Figure 4. Its ends may be slightly bent or curved outwardly, as shown, and one of said ends abuts the pin 6, as shown by Figure 2, when the ring is in use. The described form of the inner member 2, furnishes a degree of elasticity, providing a practically continuous distributed inward pressure on the inner wall of the piston groove, and at the same time, a distributed outward pressure on the outer member 1. The pressure thus exerted on the outer member retains it in close contact with the wall of the cylinder, and maintains the piston true in its movement during its stroke, and reduces piston slap to a minimum, or obviates it entirely.

By reason of the distributed pressure exerted by the inner member 2, on the outer member 1, from its midlength to the ends forming the slip joint at 5, the frictional wear on the outer member is evenly distributed, and is not confined, as heretofore, to the end portions at the slip joint 5.

It will be seen that the arrangement is such that the outer members 1 of the several rings present continuous or uninterrupted annular surfaces in continuous contact with the internal wall of a cylinder, preventing leakage of the explosive gas, and ensuring a maximum pressure from explosions within the cylinder, and the generation of full engine power.

Claims:

1. A piston ring composed of an expansible split annular outer member having a slip joint at one side, and an inner member formed from a flexible resilient strip initially bent into substantially U-shape with its ends relatively widely spaced apart and each limb of the U-shaped member being curved inward adjacent the free end thereof, said resilient member being so inserted in the outer member as to exert maximum pressure on the outer member at points approximately diametrically opposite the slip joint in the outer member.

2. A piston ring composed of an expansible split annular outer member having a slip joint at one side and a projection extending radially inward from said member at a point diametrically opposite said joint, and an inner member formed from a flexible resilient strip positioned within the outer member with its ends on opposite sides of said inward radial projection, the body of said strip being shaped to exert maximum pressure on the outer member at opposite sides of the projection thereon and the spaced ends thereof permitting the projection on the outer member to engage a piston head without requiring perforation of the body of the inner member.

3. A piston ring composed of an expansible split annular outer member having a slip joint at one side and integral means for engaging a piston to prevent bodily rotation of the ring on the piston, and an inner member formed from a flexible resilient strip initially bent into substantially U-shape with its ends relatively widely spaced apart and each limb of the U-shaped member being curved inward adjacent the free end thereof, said resilient member being so inserted in the outer member as to exert maximum pressure on the outer member at points approximately diametrically opposite the slip joint in the outer member.

In testimony whereof I have affixed my signature.

FREDERICK ELBERT CLARK.